United States Patent [19]

Schmidt et al.

[11] Patent Number: 5,219,643
[45] Date of Patent: Jun. 15, 1993

[54] MULTILAYERED FILMS

[75] Inventors: Fritz Schmidt, Leverkusen; Hans-Eberhard Braese, Cologne; Karl-Erwin Piejko, Bergisch Gladbach; Christian Lindner, Cologne, all of Fed. Rep. of Germany

[73] Assignee: Bayer Aktiengesellschaft, Leverkusen-Bayerwerk, Fed. Rep. of Germany

[21] Appl. No.: 754,074

[22] Filed: Sep. 3, 1991

[30] Foreign Application Priority Data

Sep. 12, 1990 [DE] Fed. Rep. of Germany ....... 4028888

[51] Int. Cl.$^5$ .................. B32B 27/08; B32B 27/30; B32B 27/40; B60K 37/00
[52] U.S. Cl. .................... 428/213; 428/215; 428/327; 428/332; 428/412; 428/423.1; 428/423.7; 428/424.2; 428/424.4; 428/424.7
[58] Field of Search ............. 428/147, 151, 172, 213, 428/215, 423.1, 423.7, 424.2, 424.4, 424.7, 327, 411.1, 412, 332

[56] References Cited

U.S. PATENT DOCUMENTS 4,902,745  2/1990  Piejko et al. .................... 525/80

FOREIGN PATENT DOCUMENTS 0295494  6/1988  European Pat. Off. .
0321832  6/1989  European Pat. Off. .
46-20155  6/1971  Japan .

Primary Examiner—Paul J. Thibodeau
Assistant Examiner—D. S. Nakarani
Attorney, Agent, or Firm—Connolly & Hutz

[57] ABSTRACT

The present invention relates to multilayered films consisting of a thermoplastic film having a long term temperature resistance above 130° C. and a tough elastic film of a mixture of a polyurethane, an acrylate rubber polymer and optionally a thermoplast resin selected from vinyl polymers.

The invention also relates to the use of the multilayered films for the production of crash pad films.

3 Claims, No Drawings

MULTILAYERED FILMS

BACKGROUND OF THE INVENTION

Multilayered films are known. They are used for food packaging, for packaging medical supplies and sports articles and for speaker cones (see, for example, DE-OS 3 722 832).

Multilayered films are produced by coextrusion, extrusion coating and laminating.

For crash pad uses as outer skin for motor vehicle fittings it has hitherto been found satisfactory to use films based on PVC modified with various polymers. Such films are normally applied to a supporting structure and back foamed with polyurethane foam as they have no dimensional stability.

The requirements to be met by such films are:
they must easily be embossed, e.g. to produce a leather imitation,
the embossed film must easily be shaped,
the film must be resistant to conventional cleaning agents,
the film must adhere to the material of the housing,
a good impact strength,
no release of gases (fogging),
good strength of the grain at high temperatures.

Films containing PVC can no longer fulfill the new requirements to be met by a crash pad film, namely long term temperature resistance of 130° C. and dimensional stability without back foaming and without a supporting structure.

Numerous materials have been tested to see whether they meet these requirements but none has been satisfactory in all respects.

One main reason for this lies in the combination of properties required: use at high temperatures and stability of the leather grain at high temperatures.

Although materials (including multilayered films) have been developed which substantially fulfill the above mentioned combination of properties of so called crash pad films (leather substitute films in the motor vehicle sector), their use in practice has hitherto been found unsatisfactory on account of the lack of so called stability of the leather grain and the dimensional stability without the aid of a supporting structure.

SUMMARY OF THE INVENTION

It has now surprisingly been found that films free from PVC may be produced with the required profile of properties by using a multilayered film in which one layer can withstand long term exposure to high temperatures in use and another layer consists of a mixture of a polyurethane and certain acrylate rubber polymers.

This invention thus relates to multilayered films, in particular having a thickness of from 0.8 to 2 mm, composed of A a thermoplastic film 0.3 to 1.8 mm in thickness having a long term temperature resistance above 130° C. and in particular having an E modulus of from 1000 to 20,000 MPa at temperatures from −40° C. to +130° C. and B a tough elastic film 0.4 to 1.5 mm in thickness composed of a mixture of B1 a polyurethane, in particular an aliphatic polyether urethane, B2 an acrylate rubber polymer, in particular an acrylate graft rubber and/or an acrylate copolymer rubber and B3 optionally a thermoplast resin selected from vinyl polymers (with the exclusion of halogenated monomers) in particular polymers based on styrene, acrylonitrile, α-methylstyrene or alkyl methacrylate.

The present invention further relates to the use of the multilayered films according to the invention for the manufacture of crash pad films.

DESCRIPTION OF THE PREFERRED EMBODIMENTS

The films used as component A according to the invention are films of known thermoplastic synthetic resins such as aromatic polycarbonates, aromatic polyaryl sulphones, aromatic polyesters or polyphenylene sulphides.

Films A which are particularly suitable for this invention are composed of thermoplastic aromatic polycarbonates having molecular weights $M_w$ (weight average) of from 10,000 to 200,000, preferably from 15,000 to 100,000 and especially from 15,000 to 50,000 ($M_w$ determined from the relative viscosity $\eta_{rel}$ in $CH_2Cl_2$ at 20° C. and at a concentration of 0.5 g per 100 ml). Other films A of thermoplastic resins suitable for this invention include films of known thermoplastic polyaryl sulphones, which may be linear (see DE-OS 27 35 144) or branched (see DE-OS 27 35 092 and DE-OS 23 05 413).

Particularly suitable linear polyaryl sulphones are the known aromatic polysulphones and polyether sulphones having molecular weights $M_w$ (weight average determined by light scattering) from about 15,000 to about 55,000, preferably from about 20,000 to about 40,000. Polyaryl sulphones of this type are described, for example, in DE-OS 17 19 244 and US-PS 33 65 517.

Suitable branched polyaryl sulphones are in particular the branched polyaryl ether sulphones according to DE-OS 23 05 413 and US-PS 39 60 815 which have molecular weights $M_w$ from about 15,000 to about 50,000, preferably from about 20,000 to 40,000.

The materials B1 of the film composition B are polyester, polyether and polyether carbonate urethanes.

For further details, see DE-AS 30 10 143.

Suitable polyether urethanes may be prepared according to DE-PS 2 302 564. Suitable polyester urethanes may be obtained according to DE-OS 2 842 806 and suitable polyether carbonate urethanes according to DE-OS 2 248 382.

Polyether carbonate urethanes having a specific gravity of from 1.13 to 1.17, preferably 1.15 g/cm³, are particularly preferred.

Materials B2 of the film composition B are partially cross-linked acrylate copolymers and/or graft polymers of vinyl monomer polymers and particulate, partially cross-linked acrylate rubbers used as graft basis.

At least partially cross-linked alkyl acrylate copolymers of a $C_1$ to $C_6$ alkyl acrylate and acrylonitrile, styrene, vinyl acetate and/or $C_1$ to $C_6$ alkyl methacrylate are particularly suitable components B2.

The average particle size of the copolymers B2 is preferably from 0.07 to 0.8 μm ($d_{50}$ value).

Other particularly suitable components B2 include graft polymers of vinyl monomers selected from styrene, α-methylstyrene, acrylonitrile and alkyl (meth)acrylate on alkyl acrylate rubbers having a particle size of from 0.08 to 0.8 μm and gel contents above 50% by weight.

Cross-linking of the components B2 is basically achieved by the addition of cross-linking vinyl or allyl monomers during the preparation of the acrylate polymer component.

The acrylate rubbers or copolymers for the purpose of this invention are synthesized from $C_1$ to $C_6$ alkyl acrylate, optionally comonomers such as styrene, acrylonitrile, vinyl acetate or $C_1$ to $C_6$ alkyl methacrylate and small quantities (up to 2% by weight) of comonomers which have a cross-linking action.

Components B2 are all known compounds.

The thermoplast resins B3 are rubber free resin polymers based on styrene or α-methylstyrene and acrylonitrile.

Preferred mixtures B consist of 90 to 10 parts by weight of B1 and 10 to 90 parts by weight of B2.

Particularly preferred mixtures B consist of 90 to 10 parts by weight of B1 and 10 to 90 parts by weight of a mixture B2 of 20 to 80% by weight of acrylate graft rubber and 80 to 20% by weight of acrylate interpolymer (percentages are based on 100 parts by weight of B2).

Particularly advantageous and preferred mixtures B contain up to 20% by weight of resin component B3, based on 100 parts by weight of B2.

All the components B1 to B3 are known polymers.

The thermoplastic polyurethanes (components B1) are known per se and are prepared by processes known in the art. They are generally synthesized from long chain polyols having molecular weights of from 400 to 10,000, diisocyanates and chain lengthening agents (preferably short chained polyols) with molecular weights of up to 400, and the NCO/OH ratio is generally from 0.95 to 1.10.

The substantially linear polyols having molecular weights of from 400 to 10,000, preferably from 800 to 6000, may be virtually any of the known polyesters, polylactones, polyethers, polythioethers, polyester amides, polycarbonates polyacetals or vinyl polymers containing preferably 2 and optionally, in minor quantities, also 3 Zerewitinoff active groups (mainly hydroxyl groups), such as, for example, polybutadiene diols, polyhydroxyl compounds already containing urethane or urea groups, optionally modified natural polyols and other compounds containing Zerewitinoff active groups such as amino, carboxyl or thiol groups. These compounds are known in the art and have been described in detail, e.g. in DE Offenlegungsschriften Nos. 23 02 564, 24 23 764 and 25 49 372,(U.S. Pat. No. 3,963,679) and 24 02 840 (U.S. Pat. No. 3,984,607) as well as DE-AS 24 57 387 (U.S. Pat. No. 4,035,213). Hydroxyl group-containing polyesters of glycols or adipic acid, phthalic and/or terephthalic acid and their hydrogenation products, hydroxyl polycarbonates, polycaprolactones, polyethylene oxide, polypropylene oxide, polytetrahydrofuran and mixed polyethers of ethylene oxide and propylene oxide are preferred.

The diisocyanates used may be the aliphatic, cycloaliphatic, aromatic, araliphatic and heterocyclic diisocyanates known in the art such as those described e.g. in the above mentioned DE Offenlegungsschriften 23 02 564, 24 23 764, 25 49 372, 24 02 840 and 24 57 387. Isophorone diisocyanate, 4,4'-diisocyanatodiphenyl methane and hexamethylene diisocyanate optionally substituted by methyl groups are also preferred diisocyanates.

The above mentioned diisocyanates may be used together with up to about 15 mol% (based on the diisocyanate) of a higher functional polyisocyanate but the quantity of the latter is limited to that which will still result in a fusible or thermoplastic product. A larger quantity of higher functional isocyanates must generally be compensated for by the addition of hydroxyl or amino compounds (or also monoisocyanates) which have an average functionaility of less than 2 so that excessive chemical cross-linking of the product will be avoided. The reaction may, of course, also be carried out in such a manner that subsequent chemical cross-linking of the elastomer takes place during storage (e.g. by using an excess of compounds containing NCO groups). Examples of higher functional isocyanates and monofunctional compounds may also be found in the state of the art cited above. Examples include monoamines such as butylamine and dibutylamine, octylamine, stearylamine, N-methylstearylamine, pyrrolidine, piperidine and cyclohexylamine as well as monohydric alcohols such as butanol, 1-ethyl hexanol, octanol, dodecanol, amyl alcohols, cyclohexanol and ethylene glycol monoethyl ethers.

The chain lengthening agents to be used are also known per se and are described e.g. in DE-A 23 02 564, 24 23 764, 25 49 372, 24 02 799, 24 02 840 and 24 57 387. These are low molecular weight polyhydric alcohols (preferably glycols), polyamines, hydrazines and hydrazides. Amino alcohols such as ethanolamine, diethanolamine, N-methyl diethanolamine, triethanolamine and 3-amino propanol may also be used according to the invention. The following are preferred chain lengthening agents: ethylene glycol, di- and tri-ethylene glycol, 1,2-propane diol, 1,3- and 1,4-butane diol, 1,6-hexane diol, 2-ethylhexane diol-(1,3), 2,2-dimethylpropane diol, 1,4-bis-hydroxymethyl cyclohexane and hydroquinone dihydroxy ethyl ether. Among these, hydroquinone-di-β-hydroxyethyl ether, 1,4-butane diol and 1,6-hexane diol are particularly preferred.

The composite of thermoplastic film A and thermoplastic tough elastic film B may be produced either by coextrusion of the two materials by means of a thermally separated 2-channel broad sheeting die or by extrusion coating of film B with the molten thermoplastic synthetic resin A.

The molten coextrudate is drawn off over cooling rollers and rolled up.

The compositions B of the individual components B1, B2 and optionally B3 are mixed by known methods in a previous compounding step. The resulting mixture is then used for producing the composite material, as described above.

The following examples demonstrate the surprising and advantageous stability of the embossing at elevated temperatures of a composite film according to the invention.

EXAMPLES

Acrylate Copolymer B2+B3 used, prepared according to EP 32 1832

Emulsion copolymer of 30% by weight of acrylonitrile and 70% by weight of n-butyl acrylate cross-linked by co-polymerisation with 0.45% by weight of triallyl cyanurate, based on 100 parts of the total amount of acrylonitrile and butyl acrylate. The polymer was produced by radical aqueous emulsion polymerisation, using sodium salts of $C_{14}$ to $C_{16}$ alkyl sulphonic acids as emulsifier. The polymer has a gel content of 92% by weight and an average particle size ($d_{50}$) of 0.12 μm. The emulsion polymers B are worked up by mutual coagulation with 10% by weight of a styrene/acrylonitrile emulsion polymer (monomer ratio 72/28).

Graft Polymer B2+B3 used

Graft polymer of 60 parts by weight of a coarse particled acrylate rubber having an average particle diameter ($d_{50}$) of 0.50 μm and a gel content (in dimethyl formamide) of 95% by weight prepared by cross-linking copolymerisation of n-butyl acrylate (triallyl cyanurate according to EP-A 34 748) and 30 parts by weight of graft polymerised monomers of 72% by weight of styrene and 28% by weight of acrylonitrile prepared by radical emulsion polymerisation in the presence of the acrylate rubber latex. The graft polymer B2 is worked up by mutual coagulation with 20% by weight of a styrene/acrylonitrile emulsion polymer (monomer ratio 72/28).

B1) Polyurethane used

The polyurethane is described in EP 0 462 471 (polyurethane component A4), a polyether urethane having a specific gravity of 1.12 g/cm$^3$.

A Polyarbonate used

Aromatic polycarbonate based on bisphenol A having a molecular weight $M_w$ of 30,000 (determined at $\eta_{rel}$ in CH$_2$Cl$_2$ at 20° C. and at a concentration of 0.5 g/100 ml).

EXAMPLE 1

A film of aromatic polycarbonate A having a thickness of 0.6 mm is coated in known manner with a mixture of the polyether urethane B1 and an acrylate rubber polymer B2+B3 in a ratio of 50 to 50 so that the total thickness of the composite is 1.1 mm. To produce a surface structure on layer B, the steel take off roller is covered with an embossing design so that the composite film produced under heat and pressure may have, for example, the texture of a leather grain on the surface.

The composite film retains a matt, embossed surface even after thermal vacuum shaping at surface temperatures above 150° C. and has the following properties:

very good inherent stability of the deep drawn part at test temperatures of 130° C. even without the aid of a polyurethane filling foam and supporting structure, very good resistance to aging by light and heat, no release of gases, e.g. in a motor vehicle (fogging), and resistance to conventional cleaning agents.

We claim:

1. Multilayered films consisting of
A) a thermoplastic film 0.3 to 1.8 mm in thickness and
B) an elastic film 0.4 to 1.5 mm in thickness composed of a mixture of
    B1) a polyurethane
    B2) particulate partially cross-linked acrylate rubbers having a grafted vinyl polymer thereon, and optionally having a grafted vinyl polymer thereon.
    B3) a thermoplast resin selected from vinyl polymers with the exclusion of halogenated monomers.

2. Multilayered films consisting of
A) a thermoplastic film 0.3 to 1.8 mm in thickness and
B) an elastic film 0.4 to 1.5 mm in thickness composed of a mixture of
    B1) a polyurethane
    B2) a particulate, partially cross-linked interpolymer of alkyl acrylates and comonomers selected from the group consisting of acrylonitrile, styrene and alkyl methacrylate, and optionally
    B3) a thermoplast resin selected from vinyl polymers with the exclusion of halogenated monomers.

3. A multilayered film consisting of
A) a thermoplastic film 0.3 to 1.8 mm in thickness and
B) an elastic film 0.4 to 1.5 mm in thickness composed of a mixture of
    B1) a polyurethane
    B2) an acrylate rubber polymer and optionally
    B3) a thermoplast resin selected from vinyl polymers with the exclusion of halogenated monomers, wherein said multilayered film has been shaped into an outer skin for motor vehicle fittings.

* * * * *

UNITED STATES PATENT AND TRADEMARK OFFICE
CERTIFICATE OF CORRECTION

PATENT NO. : 5,219,643
DATED : June 15, 1993
INVENTOR(S) : Schmidt et al

It is certified that error appears in the above-indentified patent and that said Letters Patent is hereby corrected as shown below:

Column 6, line 17-18

Claim 1, part B2), after "optionally", remove "having a grafted vinyl polymer thereon".

Signed and Sealed this

Twenty-second Day of March, 1994

Attest:

BRUCE LEHMAN

*Attesting Officer*     *Commissioner of Patents and Trademarks*